(12) United States Patent
Tanabe (10) Patent No.: US 10,373,498 B2
(45) Date of Patent: Aug. 6, 2019

(54) INTER-VEHICLE COMMUNICATION DEVICE

(71) Applicant: Honda Motor Co., Ltd., Tokyo (JP)

(72) Inventor: Hiroyuki Tanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/456,939

(22) Filed: Mar. 13, 2017

(65) Prior Publication Data

US 2017/0263125 A1    Sep. 14, 2017

(30) Foreign Application Priority Data

Mar. 11, 2016    (JP) .................................. 2016-048263

(51) Int. Cl.
*G08G 1/16* (2006.01)
*H04L 29/08* (2006.01)

(52) U.S. Cl.
CPC .............. *G08G 1/161* (2013.01); *G08G 1/163* (2013.01); *G08G 1/164* (2013.01); *H04L 67/12* (2013.01); *H04L 67/18* (2013.01)

(58) Field of Classification Search
CPC .......... G08G 1/161–1/166; G08G 1/22; H04L 67/12; B60W 2050/008; B60W 2550/408; B60W 2750/308; B60W 30/16; H04W 88/02
See application file for complete search history.

(56) References Cited

U.S. PATENT DOCUMENTS

2013/0124064 A1* 5/2013 Nemoto ............. B60K 31/0058
701/96
2013/0131949 A1* 5/2013 Shida ........................ B60T 7/00
701/96
2014/0107890 A1* 4/2014 Funabashi ................ G08G 1/22
701/36
2016/0148511 A1* 5/2016 Shibata .................. G08G 1/162
701/119
2016/0155329 A1* 6/2016 Goto ................ G08G 1/096791
340/903

FOREIGN PATENT DOCUMENTS

JP    2012-507061 A    3/2012

OTHER PUBLICATIONS

Office Action dated Oct. 24, 2017, issued in counterpart Japanese Application No. 2016-048263, with English machine translation. (4 pages).

* cited by examiner

*Primary Examiner* — Orlando Bousono
(74) *Attorney, Agent, or Firm* — Westerman, Hattori, Daniels & Adrian, LLP (57) ABSTRACT

A communication device (202) for performing communication with other vehicle through a wireless communication network which performs communication by switching a communication state to a standby state or to a connecting state, and a state setting means (208) for selectively setting a state of the communication device to the standby state or to the connecting state are provided, wherein the state setting means judges whether or not at least one predetermined condition is met based on the information on an own vehicle and/or the information on other vehicle, sets the communication device to the connecting state when the condition is met, and sets the communication device to the standby state provided that the condition is not met.

3 Claims, 5 Drawing Sheets

INTER-VEHICLE COMMUNICATION DEVICE

CROSS-REFERENCE OF RELATED APPLICATION

This application claims priority of Japanese Patent Application No. 2016-048263 filed in Japan on Mar. 11, 2016, the entire contents of which are incorporated herein by reference.

TECHNICAL FIELD

The present relates to an inter-vehicle communication device for performing inter-vehicle communication and, more particularly, to an inter-vehicle communication device which can effectively utilize a communication resource (such as a wireless band and a communication capacity) of a wireless communication network constituting all or part of the inter-vehicle communication.

BACKGROUND OF THE INVENTION

Previously, with a view to preventing in advance the occurrence of an encountered collision accident or a rear-end accident between vehicles, a study of an inter-vehicle Communication system has been made, which transfers position information of each vehicle and vehicle operation information such as accelerator operation and brake operation between vehicles within a range of a predetermined distance, with each other through communication (RC-013 standards in Japan, CAM (Cooperative Awareness Message) and DENM (Decentralized Environmental Notification Message) standards in Europe, and BSM (Basic Safety Message) standards in USA, etc.). In such an inter-vehicle communication system, it is considered not only to perform communication by short-distance radio between vehicles approaching each other, but also to perform communication even between vehicles which are located apart from each other through an existing and/or new wireless communication network.

In such a wireless communication network, communication is usually performed by switching a communication state between a wireless base station and a terminal device which constitutes the wireless communication network to a standby state communicating only predetermined specified basic information or to a connecting state capable of communicating arbitrary information. For example, in the mobile communication (e.g., 3G/LTE, etc.) using a cellular wireless communication network which is an existing wireless communication network, it is known to take 100 milliseconds to a few seconds to switch from the standby state to the connecting state.

For this reason, in the case where inter-vehicle communication for the purpose of preventing in advance the occurrence of encountered collision accidents or rear-end accidents between vehicles as described above is performed through a wireless communication network, it is necessary to constantly hold the terminal device (i.e., vehicle-mounted communication device) and the wireless base station in the connecting state to instantly transfer the information in the case of the occurrence of an emergency state.

However, if each vehicle performs communication through the wireless communication network while constantly holding the connecting state to exchange operation information, there is a possibility that communication resources such as the wireless band and the communication capacity in the wireless communication network become tight and it is not possible to exchange necessary information, when needed, without delay.

SUMMARY OF THE INVENTION

Based on these backgrounds, in an inter-vehicle communication device for exchanging information between vehicles using a wireless communication network, it is desirable to prevent the tightness of communication resources such as a wireless band and a communication capacity in the wireless communication network and to exchange necessary information, when needed, without delay, through the wireless communication network.

One embodiment of the present invention provides an inter-vehicle communication device for performing inter-vehicle communication through a wireless communication network which performs wireless communication by switching a communication state to a standby state which communicates only predetermined specified basic information or to a connecting state capable of communicating arbitrary information. The inter-vehicle communication device comprise a communication device for performing communication with other vehicle through the wireless communication network, and a state setting means for selectively setting a state of the communication device to the standby state or the connecting state, wherein the state setting means judges whether or not at least one predetermined condition is met based on the information on an own vehicle and/or the information on the other vehicle, sets the communication device to the connecting state if the condition is met, and sets the communication device to the standby state provided that the condition is not met.

According to another embodiment of the present invention, at least the one predetermined condition is that other vehicle running behind the own vehicle exists within a range of the first predetermined distance from the own vehicle, and that the own vehicle is running at the first predetermined speed or higher.

According to still another embodiment of the present invention, at least the one predetermined condition is that other vehicle running ahead of the own vehicle exists with a range of the second predetermined distance from the own vehicle, and the own vehicle is running at the second predetermined speed or higher.

According to another embodiment of the present invention, at least the one predetermined condition is that the own vehicle exists within a range of a predetermined distance from an intersection.

DETAILED DESCRIPTION OF THE INVENTION

A preferred embodiment, of the present invention will now be described with reference to the accompanying drawings.

Figure 1:
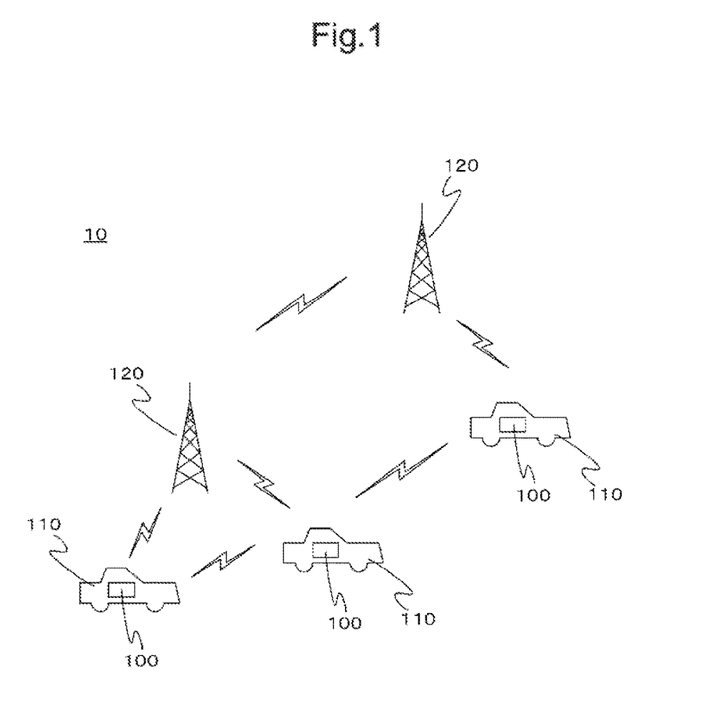
FIG. 1 is a view showing one example of a structure of an inter-vehicle communication system in which an inter-vehicle communication device according to one embodiment of the present invention is used.

FIG. 1 is a view showing one example of a structure of an inter-vehicle communication system in which an inter-vehicle communication device according to one embodiment of the present invention is used.

This inter-vehicle communication system 10 consists of a plurality of vehicles 110 each of which is provided with an inter-vehicle communication device 100 according to one embodiment of the present invention, and a wireless communication network which is provided with at least one wireless base station for performing communication by a second communication system described later between the inter-vehicle communication devices 100 provided on each vehicle 110. It is to be noted that "an own vehicle", "other vehicle", and "vehicle" described below are respectively provided with the inter-vehicle communication device 100 according to one embodiment of the present invention, unless otherwise noted.

Figure 2:
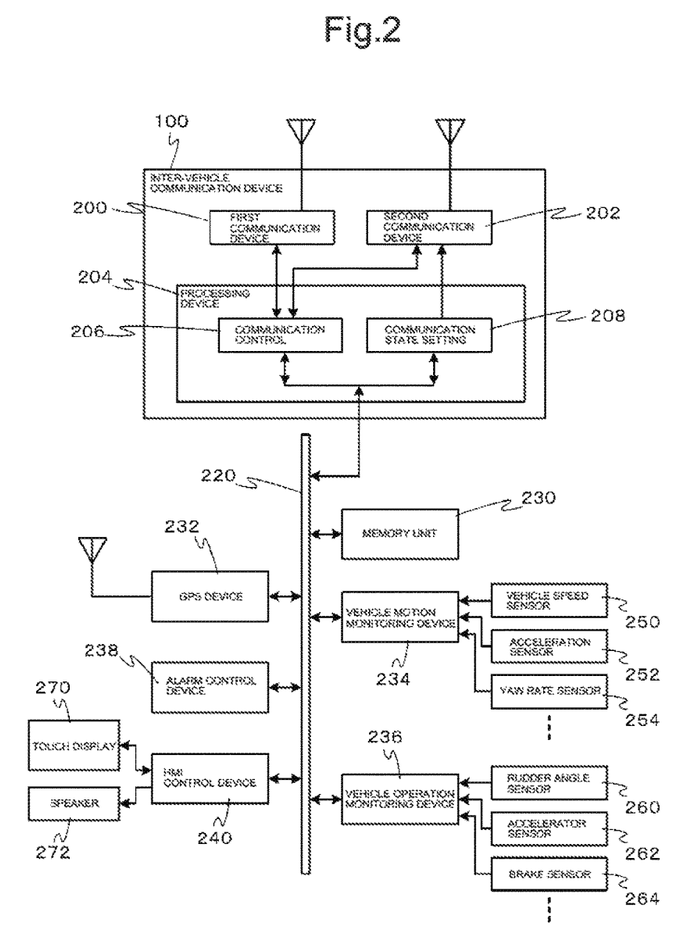
FIG. 2 is a view showing a structure of the inter-vehicle communication device according to one embodiment of the present invention.

FIG. 2 is a view showing a structure of the inter-vehicle communication device 100 according to one embodiment of the present invention. This inter-vehicle communication device 100 is connected to a memory unit 230 through a bus 220 provided on a vehicle (an own vehicle) in which the inter-vehicle communication device 100 is used.

The memory unit 230 is composed of a memory device or a data storage medium, such as a semiconductor memory and a hard disk drive device, which is writable and readable by a computer.

Also connected to the bus 220 are a GPS device 232, a vehicle motion monitoring device 234, a vehicle operation monitoring device 236, an alarm control device 238, and a HMI (Human Machine Interface) control device 240.

The GPS device 232 is a device for generating positioning information to track a present position of a vehicle (own vehicle) to which the inter-vehicle communication device 100 is connected and, for example, has a function to receive GPS signals including the data for positioning from a plurality of GPS satellites and to calculate the present position (latitude, longitude, etc.) of the own vehicle. The GPS device 232 calculates the present position of the own vehicle, for example, at specified time intervals and stores the calculated present position information (position information) of the own vehicle on the memory unit 230 through the bus 220. Further, the GPS device 232 can receive signals transmitted from a base station of a portable telephone as well as the GPS signals, and calculate the latitude and longitude of the present position also based on the position information of the base station.

The vehicle motion monitoring device 234 is connected to on-board sensors such as a vehicle speed sensor 250, an acceleration sensor 252, and a yaw rate sensor 254, provided on the own vehicle for detecting its motion state and collects information (kinetic information) on the running motion of the own vehicle from these sensors. The vehicle motion monitoring device 234 collects information from these sensors, for example, at specified time intervals and stores the collected kinetic information such as a speed, a rate of acceleration, and a turning angle of the own vehicle, in the memory unit 230 through the bus 220.

The vehicle operation monitoring device 236 is connected to on-board sensors for detecting an operation amount of an operating device provided on the own vehicle, such as a rudder angle sensor 260 for detecting a rudder angle operation amount of a steering wheel, an accelerator sensor 262 for detecting an operation amount of an accelerator pedal, and a brake sensor 264 for detecting an operation, amount of a brake pedal, and collects the information on driving operation in the own vehicle from these sensors. The vehicle operation monitoring device 236 collects information from these on-board sensors, for example, at specified time intervals, and stores the collected operation information of the own vehicle such as a rudder angle, an accelerator operation amount, and a brake operation amount, in the memory unit 230 through the buss 220.

The HMI control device 240 is connected to HMI devices such as a touch display 270 and a speaker 272, wherein the HMI control device 240 follows instruction and information given from other devices through the bus 220, displays the given information on the touch display 270, and/or outputs the information from the speaker 272. Also, the HMI control device 240 outputs the information input from a user through the touch display 270 to other devices through the bus 220.

The alarm control device 238 judges the presence or absence of the occurrence of a predetermined hazard state, based on the information on the own vehicle stored in the memory unit 230 by the GPS device 232, the vehicle motion monitoring device 234, and/or the vehicle operation monitoring device 236, and the information on the other vehicle which the inter-vehicle communication device 100 described later receives from other vehicle, then stored in the memory unit 230. And, when judged that the hazard state is occurring, the alarm control device 238 displays an alarm message, etc. on the touch display 270 through the HMI control device 240, and/or outputs alarm sound, etc. from the speaker 272.

The bus 220 may be a bus provided, for example, on the own vehicle, constituting an in-vehicle LAN (Local Area Network) which follows, for example, CAN (Controller Area Network) communication standard. In this case, the inter-vehicle communication device 100 connected to the bus 220, and each device shown by the reference numerals 230 to 240, can be constituted, for example, as an ECU (Electronic Control Unit) (or as part of such ECU) including a CAN transceiver (not shown) for performing CAN communication through the bus 220.

The inter-vehicle communication device 100 is provided with a first communication device 200, a second communication device 202, and a processing device 204.

The first communication device 200 performs communication with other vehicle by a first communication system. Here, the first communication system is a short-distance communication system such as WiFi Direct in which, for example, a communicable distance (Lcom1) is about 120 m. In other words, the first communication device 200 performs direct communication (so-called vehicle-to-vehicle communications) with the other vehicle (hereinafter referred to as "peripheral other vehicle") located within a range of the communicable distance Lcom1 of the first communication system. Hereinafter, the communicable distance Lcom1 in the first communication system is also referred as a "distance Lcom1 allowing the direct Communication".

The second communication device 202 performs communication by a second communication system with a wider range of communicable distance than that of communicable distance Lcom1 of the first communication system. Here, communication by the second communication system is the communication through a wireless communication network which performs communication by switching a communication state with a terminal device to a standby state which communicates only predetermined specified basic information or to a connecting state capable of communicating arbitrary information. The second communication device 202 is a terminal device in this second communication system and therefore, performs communication of the second communication system while switching the two states of the standby state and the connecting state. This second communication system may be a communication system using, for example, a wireless communication network such as a cellular wireless communication network.

The processing device 204 is a computer having a processor such as CPU (Central Processing Unit), ROM (Read Only memory) to which program is written, and RAM (Random Access Memory) for temporarily storing data and is provided with a communication control unit 206 and a communication state setting unit 208.

Each unit provided on the processing device 204 is realized by the execution of the program by the processing device 204 which is the computer, and the computer program can be stored in an arbitrary memory medium readable by the computer. Instead, all or part of each unit can also be composed of hardware including one or more electronic circuit components.

The communication control unit 206 refers, for example, at specified time intervals, to the information on the own vehicle stored in the memory unit 230 by the GPS device 232, the vehicle motion monitoring device 234, and/or the vehicle operation monitoring device 236 through the bus 230, and generates vehicle information on the own vehicle adding communication identification information of the second communication device 202 to the information on the own vehicle including the position information and the speed information. Here, the "communication identification information" means identification information for identifying the second communication device 202 when performing communication in the second communication system, wherein the terminal device of the second communication system performs communication of the second communication system by specifying a specific terminal device (e.g., specific second communication device 202) as a communication partner using the communication identification information.

The communication control unit 206 broadcasts the generated vehicle information on the own vehicle to the peripheral other vehicles by the first communication device 200 at regular intervals (e.g., at the specified time intervals) or at odd intervals.

Further, the communication control unit 206 receives vehicle information, on the other vehicle transmitted from the other vehicle from the first communication device 202 and/or the second communication device 202, and stores the information in the memory unit 230 through the bus 220.

Still further, the communication control unit 206 performs communication using the second communication device 202. For example, the communication control unit 206 reads out, from the memory unit 230, information (e.g., the position information of the own vehicle) needed for the basic information used when the second communication device 202 communicates with a server (e.g., a server of a wireless base station constituting a cellular wireless communication network) constituting a communication network of the second communication system in a standby state, and provides the information to the second communication device 202.

Also, the communication control unit 206 refers to the information on the own vehicle stored in the memory unit 230 at specified time intervals and judges whether or not a state of the own vehicle meets a predetermined condition based on the information on the own vehicle (e.g., whether or not the own vehicle is in a state of emergency such as sudden slowdown). And, when judged that the state of the own vehicle meets the predetermined condition, the vehicle information on the own vehicle is immediately transmitted by the first communication device 200 and at the same time, transmitted to the other vehicle which exists within a range of the predetermined distance from the own vehicle (e.g., within a range of the distance Lcom2 (hereinafter referred to as indirect communication target distance Lcom2 ) longer, by the predetermined distance, than the distance Lcom1 allowing the direct communication from the own vehicle).

Meanwhile, when transmitting the vehicle information on the own vehicle by the first communication device 200, the communication control unit 206 can also transmit vehicle information on the other vehicle stored in the memory unit 230. Accordingly, "vehicle information on the other vehicle" transmitted from the other vehicle, which is received by the first communication device 200, can include not only the vehicle information on the other vehicle which is a transmission source, but also the vehicle information on the other vehicle other than the other vehicle which is the transmission source. With this, a vehicle provided with inter-vehicle communication device 100 can also obtain the vehicle information on the other vehicle other than the other vehicle which the other vehicle as a communication partner obtained (e.g., by the communication of the first communication system and/or the second communication system) and store and accumulate the vehicle information in the memory unit 230. The vehicle information on the other vehicle accumulated in such a manner can be kept on a predetermined scale, for example, by destroying the vehicle information which has past a predetermined time since the information was obtained last, and/or by destroying the vehicle information other than the latest information of a predetermined number of vehicles.

The communication state setting unit 208 judges whether or not a predetermined condition is met based on the information on the own vehicle and/or the information on the other vehicle stored in the memory unit 230 (e.g., the vehicle information received from the other vehicle) and gives instructions to the second communication device 202 based on the judgment result to set the second communication device 202 to the connecting state or the standby state. The predetermined condition (hereinafter also referred to as a "connecting state setting condition") can be a condition capable of indicating the presence or absence of the occurrence of imminent traffic situation which, for example, requires rapid exchange of information with the other vehicles or the presence or absence of possibility of its occurrence.

For example, the communication state setting unit 208 can set the second communication device 202 to the connecting state when the connecting state setting condition meets any one of the following conditions:

First condition: "Other vehicle running behind the own vehicle exists within a range of a first predetermined distance from the own vehicle, and the own vehicle is running at a first predetermined speed or higher";

Second condition: "Other vehicle running ahead of the own vehicle exists within a range of a second predetermined distance from the own vehicle, and the own vehicle is running at a second predetermined speed or higher"; and Third condition: The own vehicle is running within a range of a predetermined distance from an intersection.

Now, the first predetermined speed can be determined according to a distance between other vehicle which exists within a range of the first predetermined distance and the own vehicle, or the range of the first predetermined distance can be determined according to a speed of the own vehicle which is the first predetermined speed or higher.

Further, the second predetermined speed can be determined according to a distance between other vehicle which exists within a range of the second predetermined distance and the own vehicle, or the range of the second predetermined distance can be determined according to a speed of the own vehicle which is the second predetermined speed or higher.

By setting the second communication device 202 to the connecting state according to the first condition and/or the second condition, for example, in the case where a plurality of vehicles including the own vehicle are running at high speed with a certain distance interposed between them, information that the own vehicle or the other vehicle braked suddenly is immediately transmitted to the other vehicle which is a following vehicle or is immediately received by the own vehicle which is a following vehicle, by the second communication device 202 which was set to the connecting state, thereby alerting a driver of the following vehicle (other vehicle or own vehicle) to take the appropriate response (e.g., braking for avoiding predictable rapid approach to the preceding vehicle).

In other words, by setting the second communicating device 202 to the connecting state by the first condition and/or the second condition, rapid transmission of communication can be executed by the second communication device 202 as well as the first communication device 200. Accordingly, for example, the sudden braking information can be immediately transmitted even to a vehicle which is running a plurality of vehicles behind the vehicle which braked suddenly and is in a farther position (e.g., a position to the indirect communication target distance Lcom2) than a distance Lcom1 allowing the direct communication from the vehicle which braked suddenly, thereby avoiding the tragedy like multiple collisions.

Also, by setting the second communication device 202 to the connecting state by the third condition, for example, even in the case where communication by the first communication device 200 tends to stop at an intersection where a radio wave state is bad by the existence of an obstacle, etc. such as a high building, it is possible to immediately exchange the information on the mutual vehicle speeds between the other vehicle and the own vehicle approaching the intersection by the second communication device 202 set to the connecting state, and to alert a driver of each vehicle to take the appropriate response for avoiding an encountered collision at the intersection. Further, for example, on condition that the memory unit 230 stores map information in advance or the map information can be obtained from a remote server through the second communication device 202, the judgment of positional relation between the own vehicle and the intersection can be made based on the stored or obtainable map information and the present position of the own vehicle stored in the memory unit 230 by the GPS device 232.

Meanwhile, after the connecting state setting condition is met and the second communication device 202 is set to the connecting state, the communication state setting unit 208 can set the second communication device 202 to the standby state provided that the connecting state setting condition is not met (e.g., immediately, or provided further that a predetermined time has passed since the connecting state setting condition was not met).

Figure 3:
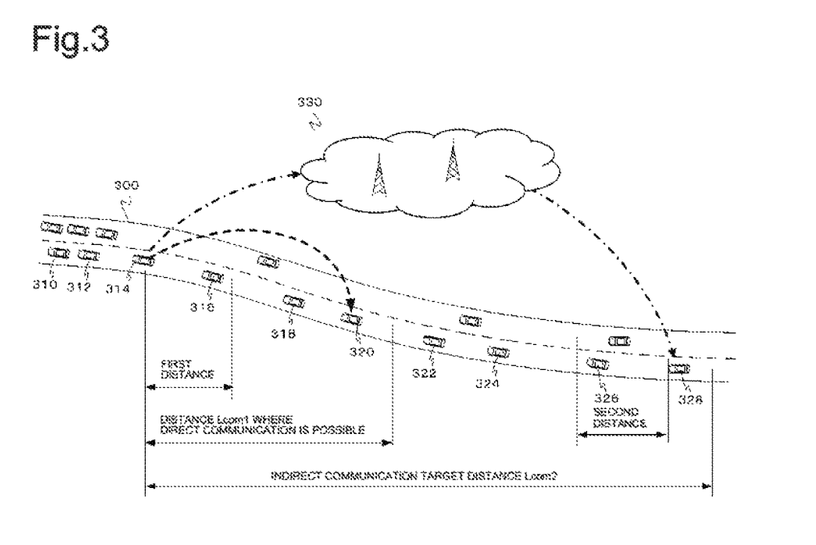
FIG. 3 is a view for explaining one example of the effectiveness according to the inter-vehicle communication device shown in FIG. 2.

FIG. 3 is a view showing one example of a traffic situation capable of producing an effect when setting the second communication device 202 to the connecting state according to the first and second conditions. In the example shown in the figure, vehicles 310, 312 to 328 are running on the same lane of expressway 300 in the same direction (in the left direction in the figure) at the first and second predetermined speeds or higher, and the vehicles 314, 320, and 328 are respectively provided with the inter-vehicle communication device 100.

At this time, by the existence of a vehicle 316 running at a first predetermined speed or higher within a range of the first predetermined distance behind the own vehicle, the inter-vehicle communication device 100 of a vehicle 314 sets the second communication device 202 of the inter-vehicle communicating device 100 of the vehicle 314 to the connecting state. Also, by the existence of a vehicle 326 which is running at a second predetermined speed or higher within a range of the second predetermined distance ahead of the own vehicle, the inter-vehicle communication device 100 of a vehicle 328 sets the second communication device 202 of the inter-vehicle communication device 100 of the vehicle 328 to the connecting state.

At this time, when the vehicle 314 discovers a preceding vehicle 312 which is slowing down on the expressway 300 and brakes suddenly, the sudden braking information is immediately transmitted through the first communication device 200 to a vehicle 320 which is located within a range of a distance Lcom1 allowing the direct communication from the vehicle 314. And, at the same time, since the second communication devices 202 of the vehicles 314 and 328 are respectively set to the connecting states, the sudden braking information is immediately transmitted through a wireless communication network 330 even to the vehicle 328 which is located within a range of the predetermined distance (e.g., within a range of the indirect communication target distance Lcom2) farther than the first communicable distance from the vehicle 314.

With this, referring to the vehicles 320 and 328, vehicles following the vehicle 316 suddenly slows down one after another due to sudden braking by the vehicle 314, and the vehicles 320 and 328 can slow down in advance based on the sudden braking information on the vehicle 314 which acquired respectively from the first communication device 200 and the second communication device 202 before the preceding vehicles 318 and 326 suddenly slow down respectively. As a result, it is possible not only to prevent rear-end accidents between the vehicles 320 and 318 arising from the sudden brake of the vehicle 314, but also to easily avoid the occurrence of multiple collisions of vehicles involving the vehicle 328 located within a range of the indirect communication target distance Lcom2 farther than the distance Lcom1 allowing the direct communication.

Figure 4:
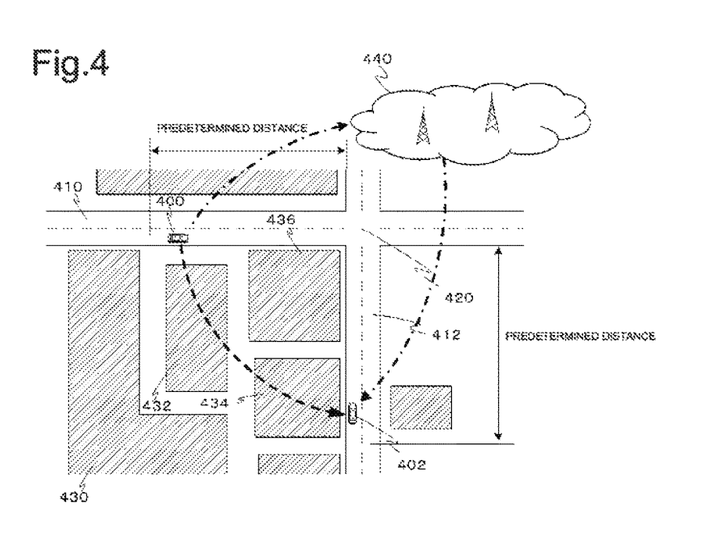
FIG. 4 is a view for explaining another example of the effectiveness according to the inter-vehicle communication device shown in FIG. 2.

FIG. 4 is a view showing one example of traffic conditions capable of producing an effect in the case where the second communication device 202 is set to the connecting state according to the third condition. In the example shown in the figure, vehicles 400 and 402 which are respectively provided with the inter-vehicle communication devices 100 are running toward the same intersection 420 on the roads 410 and 412 which are different from each other. High buildings 430, 432, 434 and 436 and the like are lined up along each of the roads 410, 412 near the intersection 420, wherein the communication by the respective first communication devices 200 between the vehicles 400 and 402 is in an intermittently cut-off condition along with the running of the vehicles 400 and 402.

At this time, the inter-vehicle communication devices 100 of the vehicles 400 and 402 transfers respective second communication devices 202 to the connecting state at the time when both vehicles entered a range of the predetermined distance relative to the intersection 420 according to the third condition. With this, since, for example, the vehicle 402 can immediately know the presence or absence of change of the vehicle speed of the vehicle 400 (e.g., presence or absence of the slowdown) point by point by the communication through the wireless communication network 440 by the second communication device 202, in the case where the vehicle 400 is slowing down in front of the intersection 420, the vehicle 402 can smoothly run on the road 410 without slowing down. To the contrary, in the case where the vehicle 400 is not slowing down in front of the intersection 420, the vehicle 402 slows down to avoid the encountered collision accidents at the intersection 420.

The inter-vehicle communication device 100 with the structure described above judges whether or not a predetermined condition (the connecting state setting condition) in which rapid exchange of information is considered to be necessary is met based on the information on the own vehicle and/or other vehicles, and if the condition is met, the inter-vehicle communication device 100 sets the second communication device 202 to the connecting state and thereafter, sets the second communication device 202 to the standby state provided that the predetermined condition (the connecting state setting condition) is not met. For this reason, in the inter-vehicle communication device 100, it is possible to use in a timely manner the second communication device 202 which is in the connecting state when rapid exchange of information is needed, while utilization time of the wireless communication network by the second communication device 202 can be reduced. And, thanks to the reduction of utilization time, utilization time of the wireless communication network per one vehicle provided with the inter-vehicle communication device 100 is reduced and as a result, it is possible to prevent the tightness of communication resources such as a wireless band and a communication capacity in the wireless communication network.

In other words, by using the inter-vehicle communication device 100, it is possible to prevent the tightness of communication resources in the wireless communication network and to exchange necessary information, when needed, without delay, through the wireless communication network.

Next, steps of operation (process) of the inter-vehicle communication device 100 will be explained.

The inter-vehicle communication device 100 executes a vehicle information reception process, a communication state setting process, and a vehicle information transmission process.

(1) Vehicle Information Reception Process

This is a process executed by the communication control unit 206 in which the first communication device 200 and/or the second communication device 202 receive vehicle information on the other vehicle transmitted from the other vehicle and store the received vehicle information on the other vehicle in the memory unit 230 through the bus 220. Here, the vehicle information on the other vehicle transmitted from the other vehicle can include not only the vehicle information on the other vehicle which is a transmission source, but also the vehicle information on a vehicle other than the other vehicle held by the other vehicle which is the transmission source. This process starts when the first communication device 200 and/or the second communication device 202 received radio wave transmitted from the other vehicle (e.g., by generating an interrupt signal from the first communication device 200 and/or the second communication device 202 to the communication control unit 206 by the reception of the radio wave) after a power source of the inter-vehicle communication device 100 is turned on and is ended after the received vehicle information on the other vehicle is stored in the memory unit 230.

(2) Communication State Setting Process

This is a process executed by the communication state setting unit 208. In this process, by referring to the information on the own vehicle and/or the information on the other vehicle stored in the memory unit 230, it is judged whether or not a predetermined connecting state setting condition is met, and if met, the second communication device 202 is set to the connecting state and thereafter, the second communication device 202 is, immediately, or when an additional condition is met, set to the standby state provided that the connecting state setting condition is not met.

Figure 5:
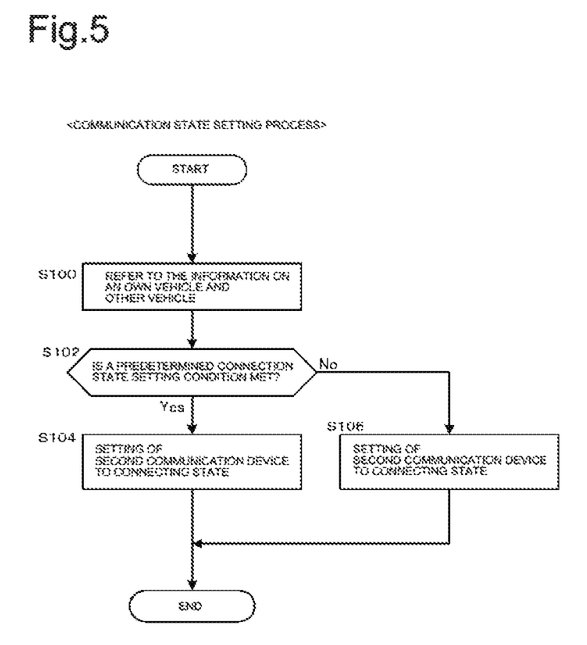
FIG. 5 is a flow chart showing the steps of a communication state setting process in the inter-vehicle communication device shown in FIG. 2.

FIG. 5 is a flow chart showing the steps of a communication state setting process. This process is repeatedly executed, for example, at specified time intervals.

When the process is started, the communication state setting unit 208 first refers to the information on the own vehicle and/or the information on the other vehicle stored in the memory unit 230 (S100) and then, judges whether or not the predetermined connecting state setting condition like the first through third conditions described above is met (S102).

And, when the predetermined connecting state setting condition is met (S102, Yes), the communication state setting unit 208 gives instructions to the second communication device 202 to set the same to a connecting state (S104), and the process is finished. On the other hand, when the predetermined connecting state setting condition is not met (S102, No), the communication setting unit 208 gives instructions to the second communication device 202 to set the same to a standby state (S106), and the process is finished.

Meanwhile, in order to avoid a frequent transition of the second communication device 202 to mutually different states, in step S106, the second communication device 202 may be set to the standby state when an additional condition is met (e.g., when a predetermined time has passed since the connecting state setting condition was not met) provided that the predetermined connecting state setting condition is not met.

(3) Vehicle Information Transmission Process

This is a process executed by the communication control unit 206. In this process, vehicle information on the own vehicle is generated using the information such as position information and kinetic information on the own vehicle stored in the memory unit 230 and the communication identification information of the second communication device 202, and the generated vehicle information on the own vehicle is broadcasted to peripheral other vehicles at specified time intervals using the first communication device 200. Also, when judged that the predetermined condition is met from the information on the own vehicle stored in the memory unit 230 (e.g., when judged that the own vehicle is in a state of emergency like abrupt slowdown), the vehicle information on the own vehicle is immediately broadcasted by the first communication device 200 and at the same time, the vehicle information on the own vehicle is transmitted even to other vehicles which exist within a range of the predetermined distance from the own vehicle (e.g., within a range of indirect communication target distance Lcom2).

Figure 6:
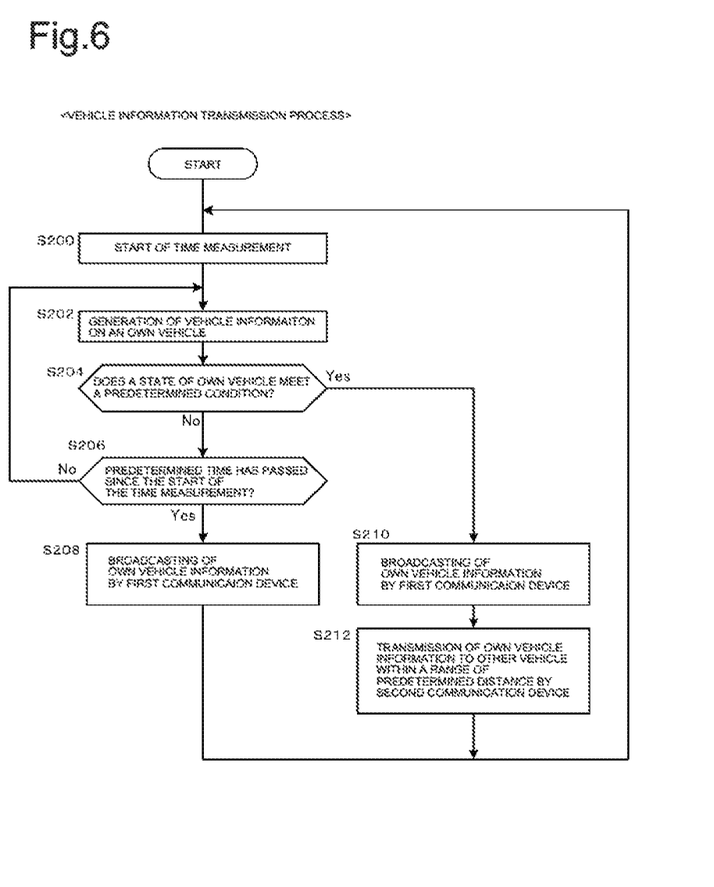
FIG. 6 is a flow chart showing the steps of a vehicle information transmission process in the inter-vehicle communication device shown in FIG. 2.

FIG. 6 is a flow chart showing the steps of a vehicle information transmission process. This process starts when a power source of the inter-vehicle communication device 100 is turned on and is finished when turned off.

When the process is started, the communication control unit 206 first starts time measurement by a timer (not shown) for adjusting transmission intervals (S200) and then, generates vehicle information on the own vehicle using the information such as position information and kinetic information on the own vehicle stored in the memory unit 230 and the communication identification information of the second communication device 202 (S202).

Next, the communication control unit 206 judges whether or not the state of the own vehicle meets the predetermined condition based on the information on the own vehicle stored in the memory unit 230 (e.g., whether or not the state of the own vehicle, such as the occurrence of sudden slowdown, falls under a state of emergency in which the vehicle information on the own vehicle is to be immediately transmitted) (S204), and if not met (S204, No), judges whether or not a predetermined time has passed since the start of time measurement in step S200 (S206).

And, when the predetermined time has not passed (S206, No), return to step 202 to repeat the process, and when the predetermined time has passed (S206, Yes), the vehicle information on the own vehicle generated in step S202 is broadcasted to peripheral other vehicles by the first communication device 200 (S208), and return to step S200 to repeat the process.

On the other hand, when judged that the state of the own vehicle meets a predetermined condition in step S204 (S204, Yes), the vehicle information on the own vehicle generated in step S202 is immediately broadcasted to peripheral other vehicles by the first communication device 200 without waiting for the passage of the predetermined time (S210), and at the same time, the vehicle information on the own vehicle is transmitted to other vehicles which exist within a range of the predetermined distance from the own vehicle (e.g., within a range of indirect communication target distance Lcom2) (S212), and then, return to step S200 to repeat the process. Further, transmission to other vehicles within a range of the predetermined distance by the second communication device 202 in step S212 can be performed, for example, by extracting vehicle information including the position information within a range of the predetermined distance from among the vehicle information on the other vehicle stored in the memory unit 230 and using the communication identification information included in the extracted vehicle information.

Further, in the present embodiment, as a condition (connecting state setting condition) for setting the second communication device 202 to the connecting state, the first and second conditions including the matters on the positional relation between the own vehicle and other vehicle and the third condition (i.e., which does not use the information on the other vehicle) based only on the position information and speed information on the own vehicle are shown, but the connecting state setting conditions are not limited to the above and can be an arbitrary condition, for example, an arbitrary condition suggesting the occurrence or a possibility of the occurrence of imminent traffic conditions which requires the rapid exchange of information with other vehicles, and/or the condition including arbitrary matters.

For example, in such a case where a plurality of events occurs in stages by the occurrence of events on the road, the connecting state setting condition may be the condition for judging whether or not a predetermined number of events among them occur or can be the condition for judging the situation in which, with reference to the events on the road which occur when a plurality of conditions are met, some conditions of them are satisfied.

Further, for example, the connecting state setting condition can also include not only the matters on the positional relation between the own vehicle and the other vehicles and the speed of the own vehicle and/or the other vehicles, but also the matters on a vehicle motion state (such as a rate of acceleration) and an operation state (such as accelerator pedal depression exceeding a predetermined amount) other than the speed in the own vehicle and/or the other vehicles, or the matters on vehicle environment system such as weather by the provision of an environment illumination sensor.

More specifically, for example, in order to set the second communication device 202 to the connecting state when there is a high possibility of traffic jam occurrence, the connecting state setting condition may be that two of the following conditions were satisfied:

(1) that the dispersion of vehicle speed is a predetermined value or higher;

(2) that the increase-decrease frequency of vehicle speed variation is a predetermined value or higher;

(3) that a reduction change of the mean value of an inter-vehicle distance per a predetermined time is a predetermined value or higher; and (4) that a reduction change of illumination of the vehicle environment is a predetermined value or higher; of the vehicles which exist within a range of a predetermined distance in front of the own vehicle and on the periphery thereof.

Further, in the embodiment described above, the inter-vehicle communication device 100 is directly connected to the on-board bus 220 to be connected to other devices such as the memory unit 230, but it may also be indirectly connected to the bus 220. For example, a relay device can be connected to the bus 220 to establish a connection with the inter-vehicle communication device 100, wherein the relay device and the inter-vehicle communication device 100 are connected by a bus (such as USB) which has a different communication standard from the bus 220 and/or are connected by short-range wireless such as Bluetooth (a registered trademark) and as a result, the inter-vehicle communication device 100 is indirectly connected to the bus 220 through the relay device. In this case, the inter-vehicle communication device 100 can be realized, for example, in the form of a multifunctional mobile terminal such as a smart phone.

Still further, the inter-vehicle communication device 100 can also be composed to include the functions of one or more devices shown in the reference numerals 230 to 240 in FIG. 2.

As described above, in the inter-vehicle communication device 100 of the present embodiment, since the second communication device 202 which performs communication of the second communication system through the wireless communication network is set to the connecting state when the predetermined connecting state setting condition is met and thereafter, it is set to the standby state provided that the connecting state setting condition is not met, it is possible to prevent the tightness of communication resources such as the wireless band and the communication capacity in the wireless communication network and to exchange necessary information, when needed, without delay, through the wireless communication network.

DESCRIPTION OF REFERENCE NUMERALS

10: inter-vehicle communication system, 100: inter-vehicle communication device, 110: vehicle, 120: wireless base station, 200: first communication device, 202: second communication device, 204: processing device, 206: communication control unit, 208: communication state setting unit, 220: bus, 230: memory unit, 232: GPS device, 234: vehicle motion monitoring device, 236: vehicle operation monitoring device, 238: alarm control device, 240: HMI control device, 250: vehicle speed sensor, 252: acceleration sensor, 254: yaw rate sensor, 260: rudder angle sensor, 262: accelerator sensor, 264: brake sensor, 270: touch display, 272: speaker, 330, 440: wide area communication network

The invention claimed is:

1. An inter-vehicle communication device comprising:
a terminal device configured to perform inter-vehicle communication through a wireless communication network, the terminal device being capable of switching its communication state between
(i) a standby state in which the inter-vehicle communication performed by said terminal device is restricted such that only predetermined specified basic information is allowed to be communicated directly between an own vehicle and another vehicle via the wireless communication network, and
(ii) a connected state in which said terminal device is allowed to perform the inter-vehicle communication at any time to communicate arbitrary information including information other than the predetermined specified basic information, said arbitrary information including information related to the own or another vehicle sent from the own or another vehicle and/or information related to a vehicle other than the own and another vehicles sent from the own or another vehicle; and
a controller configured to selectively control said communication device to operate in either of said standby state or in said connected state, wherein
said controller is configured to determine whether or not at least one condition of predetermined conditions is met based on information related to the own vehicle and/or the another vehicle,
the controller controls said terminal device to operate in the connected state if it is determined that said at least one condition is met, and controls said terminal device to operate in the standby state if it is determined that none of the predetermined conditions is met, and
said at least one predetermined condition is that the another vehicle is detected as running behind the own vehicle within a range of a first predetermined distance from the own vehicle and the own vehicle is running at a first predetermined speed or higher.

2. An inter-vehicle communication device comprising:
a terminal device configured to perform inter-vehicle communication through a wireless communication network, the terminal device being capable of switching its communication state between
(i) a standby state in which the inter-vehicle communication performed by said terminal device is restricted such that only predetermined specified basic information is allowed to be communicated directly between an own vehicle and another vehicle via the wireless communication network, and
(ii) a connected state in which said terminal device is allowed to perform the inter-vehicle communication at any time to communicate arbitrary information including information other than the predetermined specified basic information vehicle, said arbitrary information including information related to the own or another vehicle sent from the own or another vehicle and/or information related to a vehicle other than the own and another vehicles sent from the own or another vehicle; and
a controller configured to selectively control said communication device to operate in either of said standby state or in said connected state, wherein
said controller is configured to determine whether or not at least one condition of predetermined conditions is met based on information related to the own vehicle and/or the another vehicle,
the controller controls said terminal device to operate in the connected state if it is determined that said at least one condition is met, and controls said terminal device to operate in the standby state if it is determined that none of the predetermined conditions is met, and
said at least one predetermined condition is that the another vehicle is detected as running ahead of the own vehicle within a range of a predetermined distance from the own vehicle and the own vehicle is running at a predetermined speed or higher.

3. An inter-vehicle communication device comprising:
a terminal device configured to perform inter-vehicle communication through a wireless communication network, the terminal device being capable of switching its communication state between
(i) a standby state in which the inter-vehicle communication performed by said terminal device is restricted such that only predetermined specified basic information is allowed to be communicated directly between an own vehicle and another vehicle via the wireless communication network, and
(ii) a connected state in which said terminal device is allowed to perform the inter-vehicle communication at any time to communicate arbitrary information including information other than the predetermined specified basic information vehicle, said arbitrary information including information related to the own or another vehicle sent from the own or another vehicle and/or information related to a vehicle other than the own and another vehicles sent from the own or another vehicle; and
a controller configured to selectively control said communication device to operate in either of said standby state or in said connected state, wherein
said controller is configured to determine whether or not at least one condition of predetermined conditions is met based on information related to the own vehicle and/or the another vehicle,
the controller controls said terminal device to operate in the connected state if it is determined that said at least one condition is met, and controls said terminal device to operate in the standby state if it is determined that none of the predetermined conditions is met, and said at least one predetermined condition is that the own vehicle is within a range of a predetermined distance from an intersection.

* * * * *